B. McCOLLUM.
ALTERNATING CURRENT MOTOR.
APPLICATION FILED NOV. 11, 1909.
1,095,586.
Patented May 5, 1914.
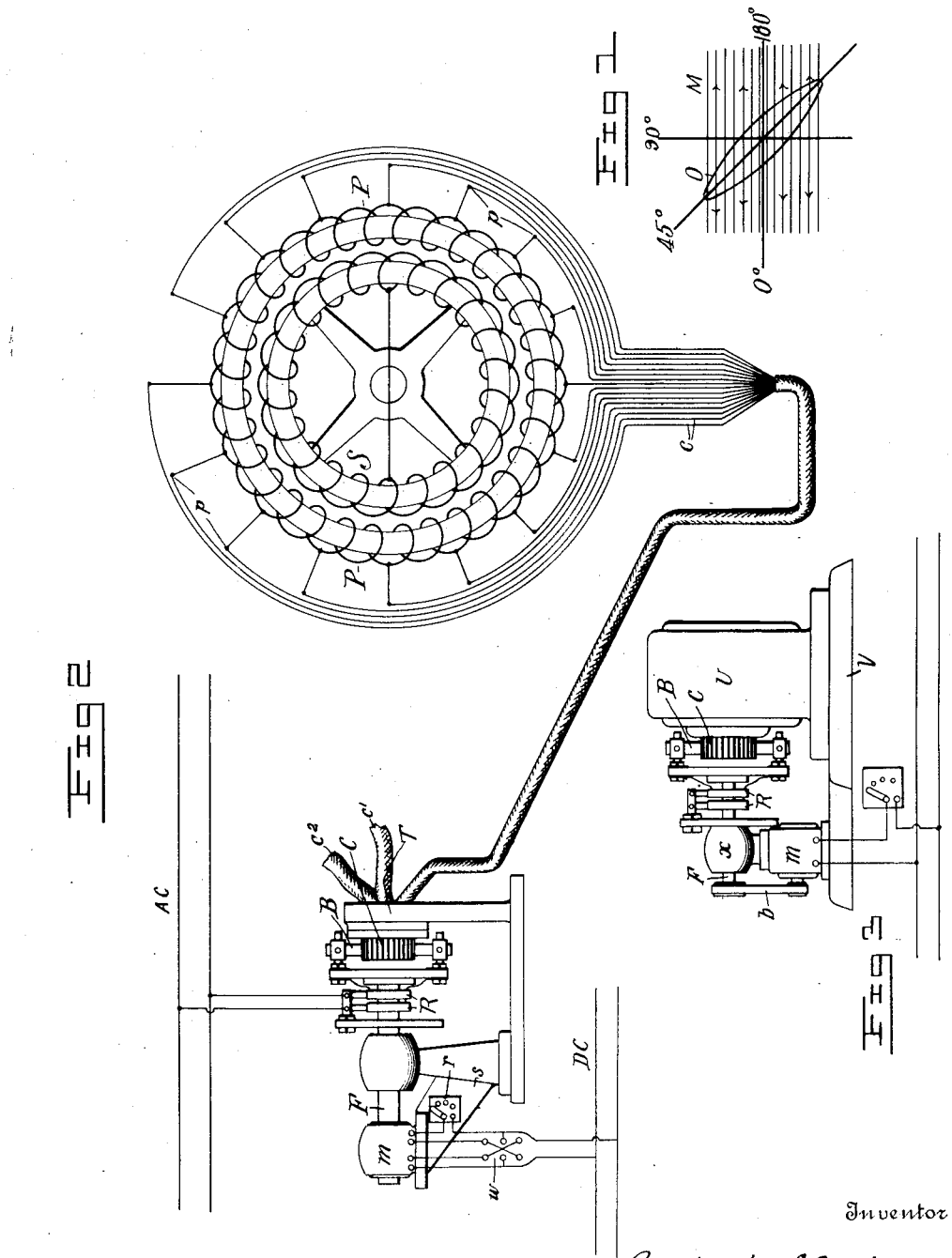

UNITED STATES PATENT OFFICE.

BURTON McCOLLUM, OF LAWRENCE, KANSAS, ASSIGNOR OF ONE-HALF TO MARTIN E. RICE, OF LAWRENCE, KANSAS.

ALTERNATING-CURRENT MOTOR.

1,095,586. Specification of Letters Patent. Patented May 5, 1914.

Application filed November 11, 1909. Serial No. 527,561.

*To all whom it may concern:*

Be it known that I, BURTON McCOLLUM, a citizen of the United States, residing at Lawrence, in the county of Douglas and State of Kansas, have invented new and useful Improvements in Alternating-Current Motors, of which the following is a specification.

The objects of my invention are to produce a reversible single phase alternating current motor of variable speed which may be started from rest with good torque, and which operates under load in a satisfactory manner.

In the accomplishment of my invention I make use of an old and well known principle. When a coil forming a closed circuit is placed in an alternating magnetic field in such a position that lines of force thread through it, there is always a tendency for that coil to assume a position with respect to the magnetic field, such that the total effective magnetic flux linking with the coil is zero. If the axis of the alternating magnetic field be shifted angularly somewhat from its original position the coil will be acted upon by a torque tending to rotate it in the same direction as the shift, and if it is free to rotate it will turn until it places itself in the same relative position as before, this position being one of equilibrium in which there are no effective lines of force linking with the coil.

The motor of my invention consists of a primary winding adapted to set up an alternating magnetic field, a secondary closed circuit winding inductively related to the primary winding, and means associated with the primary winding for progressively shifting the axis of the field set up by it, the secondary winding thus being forced to continually seek a position of equilibrium as the rotation of the axis of the field is made continuous. The position of equilibrium is never reached by the secondary winding in normal operation, the torque of the secondary winding being utilized in the useful work done by the motor.

A particular embodiment of my invention is set forth in the following description and attached drawings, in which—

Figure 1 is a diagrammatic view illustrative of the principle on which my motor is based; Fig. 2 is a somewhat diagrammatic illustration of the particular embodiment described. Fig. 3 is a view delineating a commercial embodiment of my invention.

Referring to Fig. 1 of the drawings M designates an alternating current magnetic field, and O a coil forming a closed circuit in a position about 45 degrees to the axis of the field. In this position, as in all positions of the coil between the position in which its plane coincides with the axis of the field and the position in which its plane is at 90 degrees to the field, there is a torque exerted upon by the field tending to turn it to a position in which there is an effective flux of zero lines of force. This position of zero effective flux is the position of the coil in which its plane coincides with the axis of the field. The torque varies from this zero position to the 90 degree or right angle position, and it may be readily shown mathematically that this torque is maximum at the 45 degree position shown. Clearly if the magnetic field be rotated in one direction the torque exerted on the coil in the field will cause it to rotate always seeking a position of zero effective flux.

The particular embodiment of Fig. 2 consists of a primary winding P which is stationary, and a secondary winding S which is inductively mounted within the primary winding and made the moveable winding or rotor of the motor. Preferably I make both of these windings of the well known direct current drum type, but they may well be made of any suitable type, such for instance as the ring type which serves the purpose of a diagram illustration. I tap the primary winding P at a plurality of points $p$, the number of points depending upon the design desired, and connect these taps by separate cables $c$ to the bars of a switch taps by separate cables $c$ to bars of a switch or commutator C mounted upon a stationary support T. I lead alternating current to this commutator through rotating brushes B, the current being conveyed to the rotating brushes from alternating current mains A—C through collecting rings R mounted on the same shaft. The small control motor $m$ operating from the mains D—C, drives the shaft F on which the brushes are mounted, directly, the shaft F being supported by a pedestal bearing S mounted on the extended base of the support T carrying the stationary commutator. A rheostat $r$ and a reversing switch $w$ are provided in the control motor circuit for varying the speed of the motor and reversing its direction of rotation.

When the brushes B are rotated about the commutator C by the small control motor m the axis of magnetization of the primary winding P of my motor is continuously rotated. By virtue of the current induced in the secondary winding S, there is a torque on the rotor which impels it to follow after the line of magnetization of the primary winding or stator of the motor. The amount of this torque depends upon the design of the motor, and principally upon the design of the rotor, and it may be made as great as desired at starting. The speed of the motor may be varied at will by varying the speed of the control motor m, and hence to the brushes B around the commutator and the speed of rotation of the line of magnetization of the primary P. Similarly the motor may be readily reversed by reversing the direction of rotation of the control motor m. Thus I have accomplished the objects of my invention, having produced a single phase variable speed alternating current motor which may be readily reversed, started or stopped, and which has good torque characteristics at all speeds and loads.

In Fig. 3 I have shown a structural embodiment of my invention, this delineation giving an idea as to its commercial construction. U designates the frame of the motor mounted on a base V and supporting on one side a stationary commutator C. The base V is extended on the side of the commutator just sufficiently to support the small motor m, on the back of which is a bracket x supporting the shaft F which carries the brushes B bearing on the commutator and the rings R by which alternating current is led to the brushes. The belt b from the motor to the opposite end of the shaft serves as a drive. My invention may thus be embodied in a neat and attractive commercial form.

That my improved motor is capable of use to advantage in many situations is evident. Besides doing duty as a power motor singly, it is especially adapted for use in multiple control systems, such for instance as for train propulsion and for the operation of the gates and valves of hydraulic installations. One large commutator and a single control motor m may be used for controlling any number of motors simultaneously, the number depending solely upon the proportionment of the parts of the current carrying structure. Cables $c'$ $c^2$ leading from the commutator C of Fig. 2 indicate this capability of my invention.

While I have described for the purpose of proper illustration this particular embodiment of my invention, it is evident that many modifications may be made without departing in any wise from its generic spirit, for instance, the primary or inducing winding of my motor may be made the rotating winding by a simple affixing of the commutator to the rotating shaft and driving the brushes at the simply determined relatively higher speed. Likewise by suitable modification my invention may be applied to alternating current polyphase motors with advantage. It is also obvious that by the provision of a number of pairs of brushes in rotating relation to the commutator a motor of any number of poles may be produced. I desire to cover all such modifications not departing from the generic spirit of my invention in the annexed claims.

What I claim is:—

1. The method of operating a single phase alternating current motor comprising a primary winding having a shiftable axis of magnetization, a secondary winding having an axis of magnetization unshiftable with respect to said secondary winding, a commutator, and rotatable brushes of the class described coöperating with said commutator for rotating the axis of magnetization of the primary, which method consists in continuously rotating the axis of primary magnetization in the same direction as the motor is intended to operate and at a rate proportional to the desired rate of rotation of the motor.

2. The method of operating a single phase alternating current motor comprising a primary winding having a shiftable axis of magnetization, a secondary winding having an axis of magnetization unshiftable with respect to said secondary winding, a commutator, and rotatable brushes of the class described coöperating with said commutator for rotating the axis of magnetization of the primary, which method consists in continuously rotating the axis of primary magnetization in the same direction as the motor is intended to operate and at a rate proportional to the desired rate of rotation of the motor, and in such manner as to maintain the axis of magnetization of the primary and secondary windings within forty five electrical degrees of each other throughout the period of operation of the motor.

In testimony whereof I have hereunto set my hand in presence of two subscribing witnesses.

BURTON McCOLLUM.

Witnesses:
ARTHUR L. BRYANT.
J. P. TARBOX.